(12) United States Patent
Takahashi et al.

(10) Patent No.: US 10,798,326 B2
(45) Date of Patent: Oct. 6, 2020

(54) IMAGING APPARATUS, SIGNAL PROCESSING APPARATUS, AND MOVING BODY

(71) Applicant: CANON KABUSHIKI KAISHA, Tokyo (JP)

(72) Inventors: Hidekazu Takahashi, Zama (JP); Yukihiro Kuroda, Inagi (JP); Tatsuhito Goden, Machida (JP); Akinari Takagi, Yokosuka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/661,798

(22) Filed: Oct. 23, 2019

(65) Prior Publication Data

US 2020/0059617 A1    Feb. 20, 2020

Related U.S. Application Data

(63) Continuation of application No. 15/973,914, filed on May 8, 2018, now Pat. No. 10,491,844.

(30) Foreign Application Priority Data

May 31, 2017    (JP) .................. 2017-108238

(51) Int. Cl.
*H04N 5/369*    (2011.01)
*H04N 5/232*    (2006.01)
*H04N 9/04*    (2006.01)
*H04N 5/378*    (2011.01)
*H04N 5/3745*    (2011.01)
*G05D 1/02*    (2020.01)

(52) U.S. Cl.
CPC ....... *H04N 5/3696* (2013.01); *H04N 5/23212* (2013.01); *H04N 5/36961* (2018.08); *H04N 5/378* (2013.01); *H04N 5/37452* (2013.01); *H04N 9/045* (2013.01); *H04N 9/04555* (2018.08); *G05D 1/0253* (2013.01); *H04N 5/232122* (2018.08)

(58) Field of Classification Search
CPC ............. H04N 5/3696; H04N 5/37452; H04N 9/04555; H04N 5/36961; H04N 5/378; H04N 9/045; H04N 5/23212; G05D 1/0253

See application file for complete search history.

(56) References Cited

U.S. PATENT DOCUMENTS

2018/0219046 A1*    8/2018    Yamaguchi ......... H01L 27/1463

* cited by examiner

*Primary Examiner* — Nam D Pham
(74) *Attorney, Agent, or Firm* — Canon U.S.A., Inc. IP Division

(57) ABSTRACT

A pixel includes a first electrode, a second electrode facing to the first electrode in a first direction, and a third electrode disposed between the first and second electrodes. A photoelectric conversion layer is disposed on the electrodes. Signals for phase difference detection are read from the first and second electrodes. Furthermore, a signal for imaging is read from the third electrode.

14 Claims, 16 Drawing Sheets

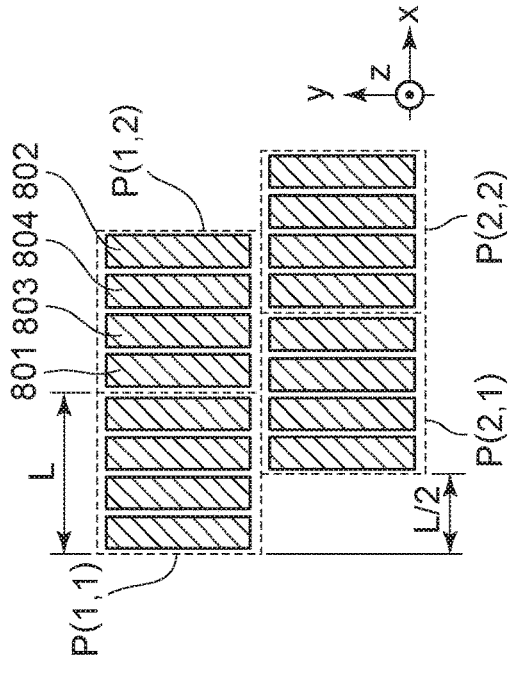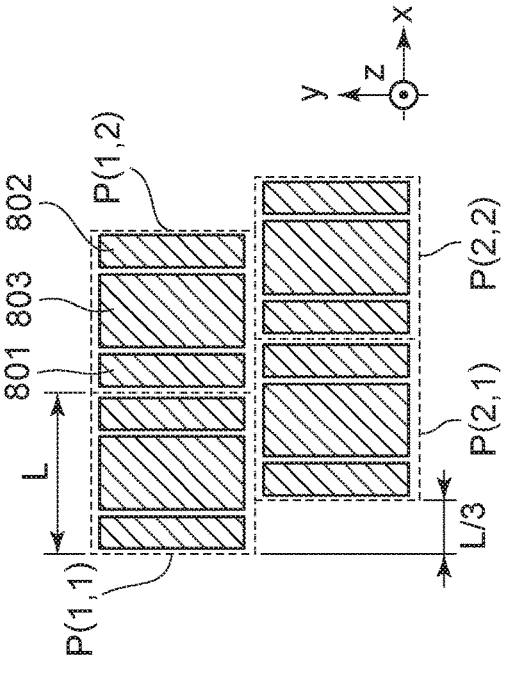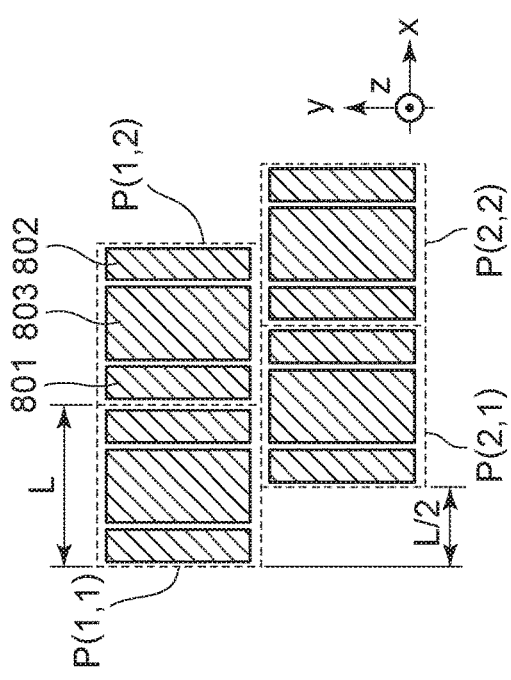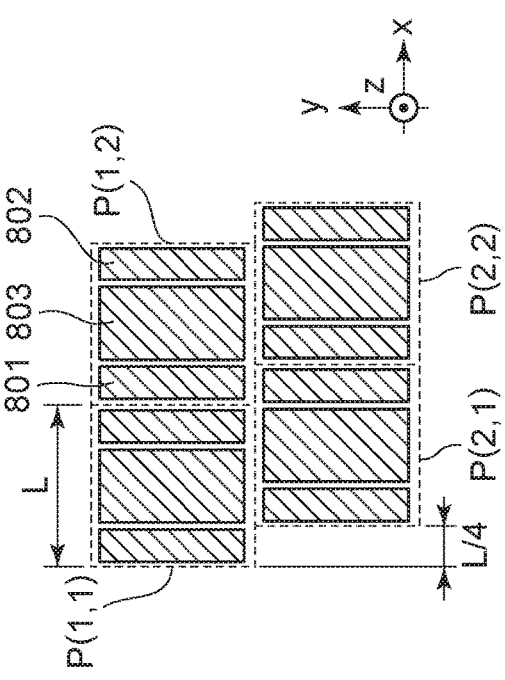

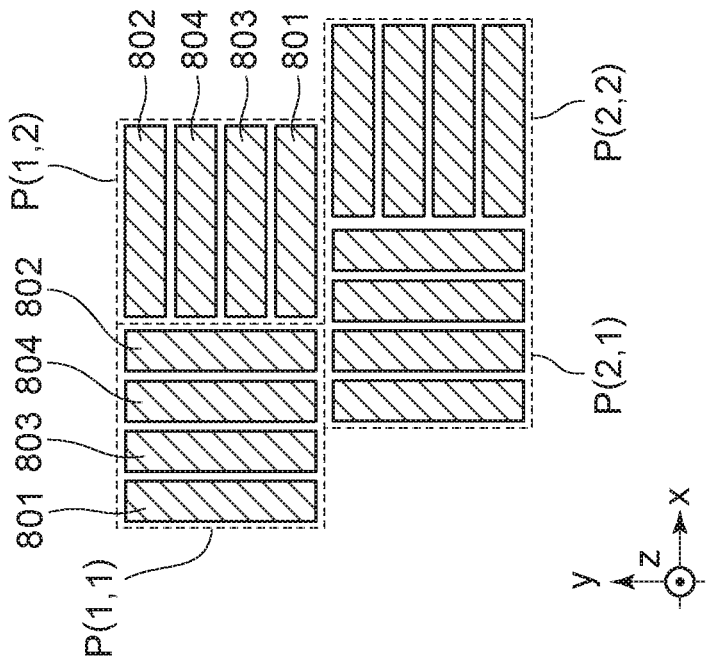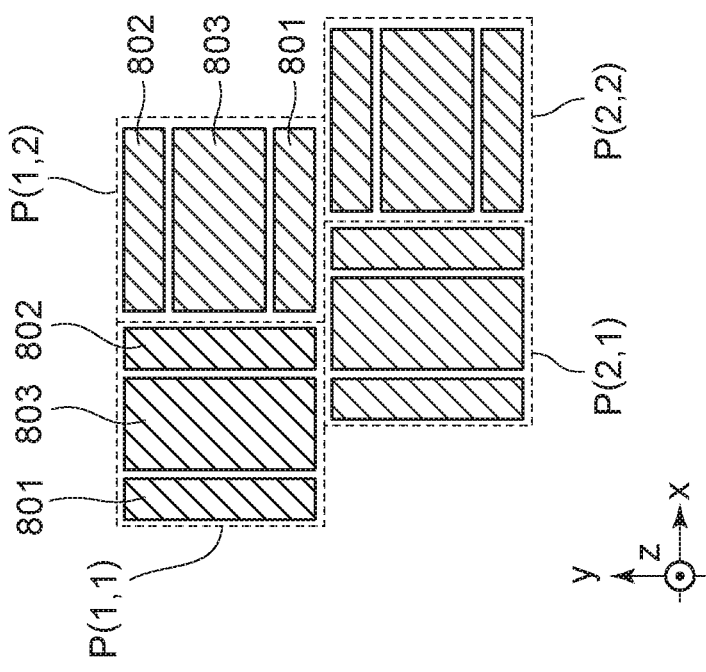

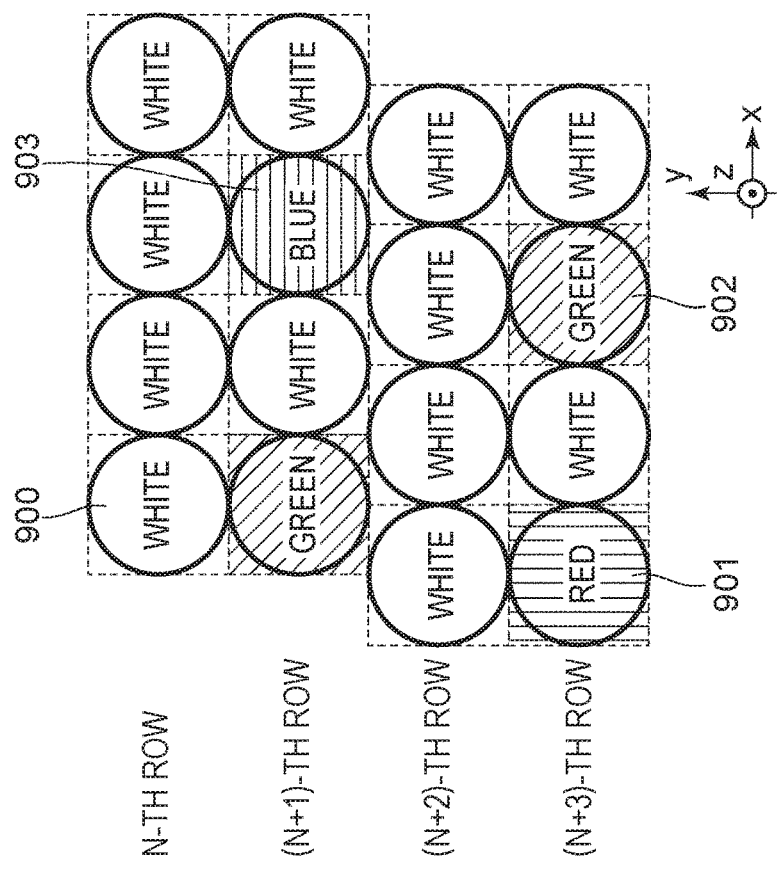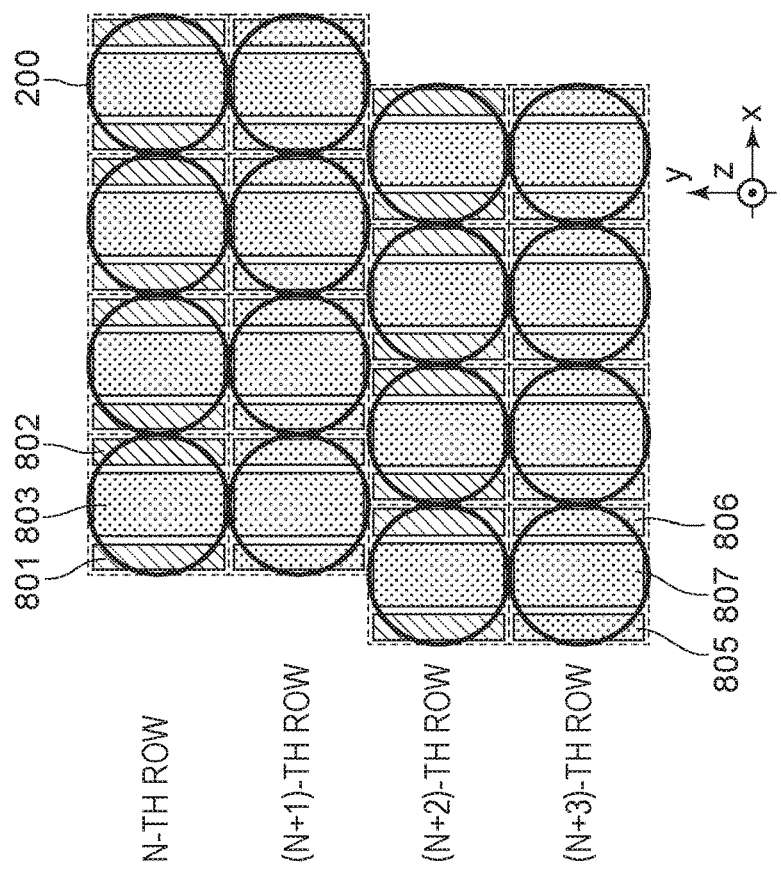

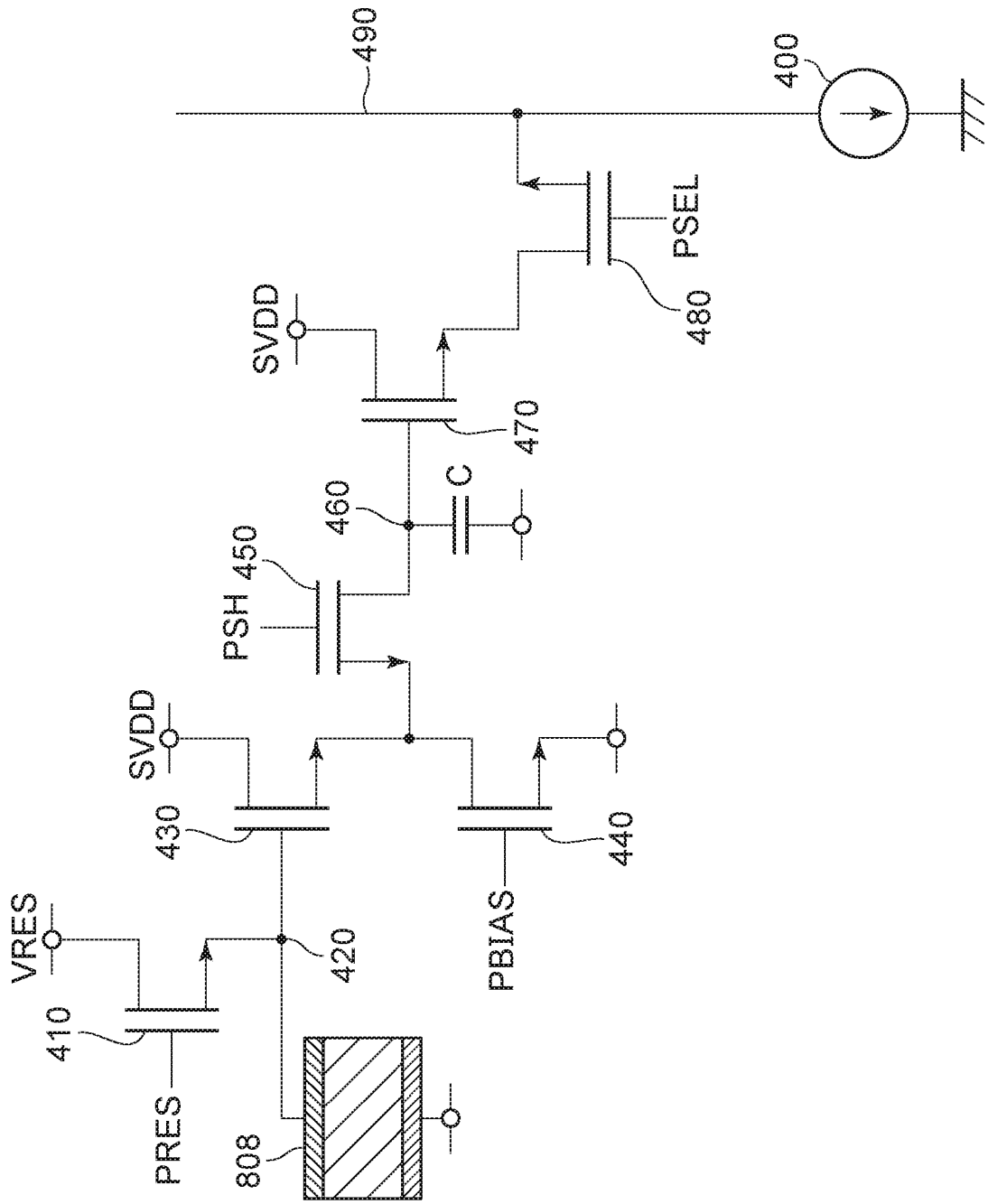

IMAGING APPARATUS, SIGNAL PROCESSING APPARATUS, AND MOVING BODY

CROSS-REFERENCE TO RELATED APPLICATIONS

This application is a continuation, and claims the benefit, of U.S. patent application Ser. No. 15/973,914, presently pending and filed on May 8, 2018, and claims the benefit of, and priority to, Japanese Patent Application No. 2017-108238 filed May 31, 2017, which applications are hereby incorporated by reference herein in their entireties.

BACKGROUND OF THE INVENTION

Field of the Invention

The present disclosure relates to an imaging apparatus capable of measuring a distance, a signal processing apparatus, and a moving body.

Description of the Related Art

Imaging apparatuses have a configuration including pixels having light receiving portions constituted by forming a photoelectric conversion layer on a substrate have been used. Japanese Patent Laid-Open No. 2015-207594 discloses an imaging apparatus using an organic photoelectric conversion layer as such a photoelectric conversion layer. Meanwhile imaging apparatuses having an autofocus (AF) function for automatically performing focus control at a time of imaging have been widely used. Japanese Patent Laid-Open No. 2015-207594 also discloses focus detection performed by a phase difference method using two pixel electrodes which are disposed in right and left portions in a divided manner underneath one micro-lens. The phase difference method is employed to obtain a defocusing amount and a distance to an object based on a triangulation principle in accordance with a phase difference between light beams which pass different regions (pupil regions) in a pupil of a lens.

In the configuration discloses in Japanese Patent Laid-Open No. 2015-207594, an element configuration for attaining high focusing accuracy is not sufficiently discussed. Accordingly, the present disclosure provides an imaging apparatus which attains higher focusing accuracy when compared with that disclosed in Japanese Patent Laid-Open No. 2015-207594.

SUMMARY OF THE INVENTION

According to an aspect of the present disclosure, an apparatus includes a plurality of pixels arranged on a substrate in a matrix. At least one of the pixels included in a first pixel group includes first electrode, a second electrode facing to the first electrode in a first direction, a third electrode disposed between the first and second electrodes, a photoelectric conversion layer disposed on the first, second, and third electrodes, a counter electrode disposed on the photoelectric conversion layer, and a micro-lens corresponding to the first, second, and third electrodes. Signals for phase difference detection are read from the first and second electrodes. A signal for imaging is read from the third electrode.

Further features of the disclosure will become apparent from the following description of exemplary embodiments with reference to the attached drawings.

BRIEF DESCRIPTION OF THE DRAWINGS

FIGS. 7A to 7D are diagrams illustrating modifications of the arrangement of the plurality of pixels according to the first embodiment.

FIGS. 8A and 8B are diagrams illustrating modifications of the arrangement of the plurality of pixels according to the first embodiment.

FIGS. 12A and 12B are diagrams illustrating a pixel array and a color filter array according to a third embodiment.

FIG. 14 is a diagram illustrating a pixel circuit of a pixel group which performs only imaging according to the fourth embodiment.

DESCRIPTION OF THE EMBODIMENTS

Figure 16A:
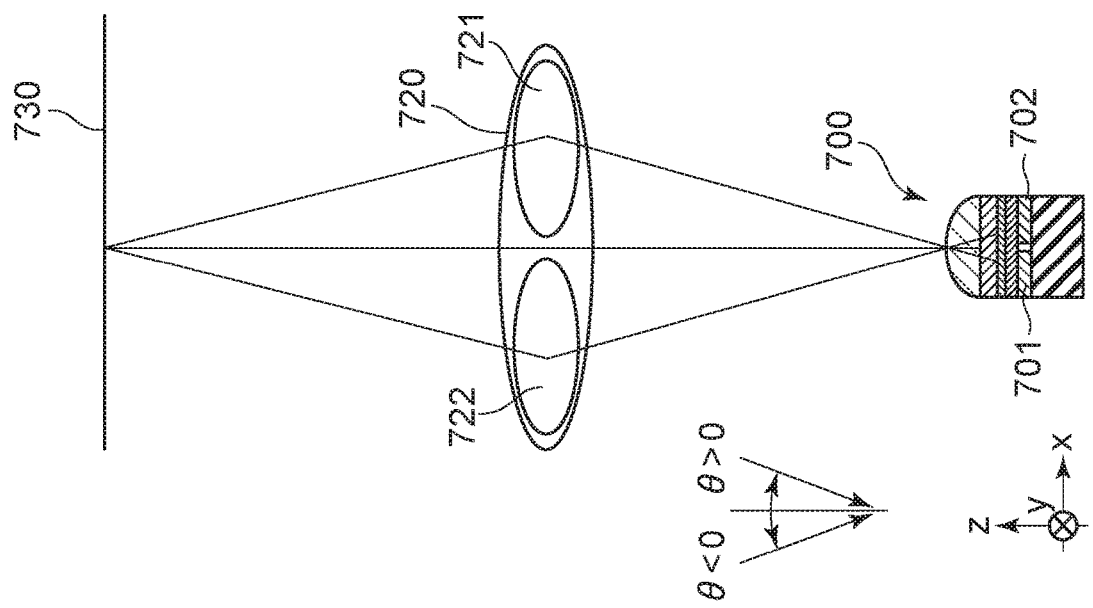
FIGS. 16A and 16B are diagrams illustrating a comparative example.

FIG. 16A is a diagram illustrating an element disclosed in Japanese Patent Laid-Open No. 2015-207594. Specifically, the element performs phase difference detection using a plurality of electrodes disposed in a lower portion of a photoelectric conversion unit. Here, a reference numeral 700 indicates a ranging pixel, a reference numeral 720 indicates an exit pupil, and a reference numeral 730 indicates an object.

In FIG. 16A, an x direction denotes a pupil division direction and pupil regions 721 and 722 are obtained by dividing the exit pupil. Light which passes the pupil region 721 generates a charge in a portion on an electrode 701 in a photoelectric conversion layer. On the other hand, light which passes the pupil region 722 generates a charge in a portion on an electrode 702 in the photoelectric conversion layer. Two parallax images are obtained from a signal charge collected by the electrode 701 (a first electrode) and a signal charge collected by the electrode 702 (a second electrode) so that distance estimation is enabled using a triangulation principle.

In general, a pixel capable of performing ranging and imaging is configured such that a region obtained by adding the pupil regions 721 and 722 corresponding to the electrodes 701 and 702 is equal to an entire surface of the pupil. However, a large parallax is applied in terms of ranging accuracy, and therefore, a large distance between centers of gravity of the pupil regions corresponding to parallaxes is applied.

Figure 16B:
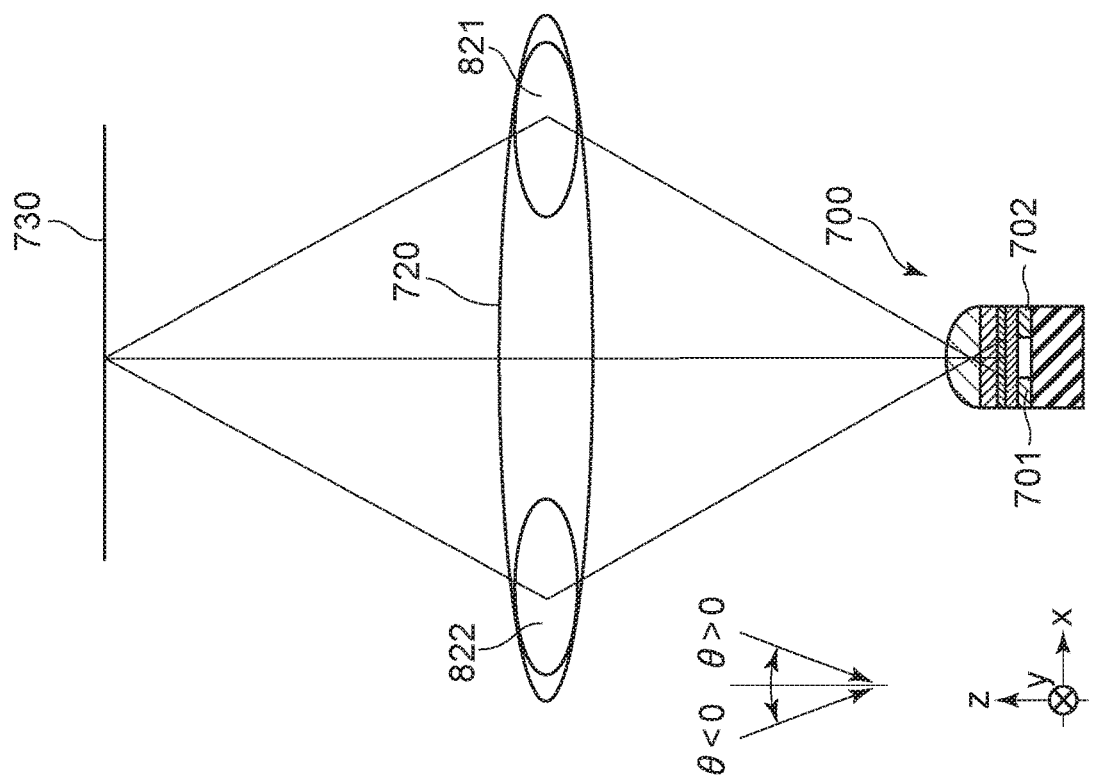

FIG. 16B is a diagram illustrating an example of arrangement of two division electrodes disposed in opposite end portions of the pixel. The electrode 701 (the first electrode) and the electrode 702 (the second electrode) are disposed in the opposite ends of the pixel. Accordingly, a distance between the centers of gravity of pupil regions 821 and 822 illustrated in FIG. 16B is longer than a distance between the centers of gravity of the pupil regions 721 and 722 illustrated in FIG. 16A. Accordingly, a long baseline length is obtained, and therefore, the ranging accuracy is improved.

When the two electrodes are separately arranged, a portion between the two electrodes is a dead region which may not obtain a signal generated by incident light and the incident light is wasted. Therefore, a third electrode is disposed between the first and second electrodes which obtain signals for phase difference detection, and an imaging signal is obtained from the third electrode. Since the third electrode is disposed between the first and second electrodes, the first and second electrodes are separately arranged, and as a result, a long baseline length may be obtained. Furthermore, a signal obtained by the third electrode is used as an imaging signal, and therefore, the signal is not wasted. Hereinafter, embodiments will be described with reference to the accompanying drawings.

First Embodiment

Entire Configuration of Imaging Apparatus

Figure 1:
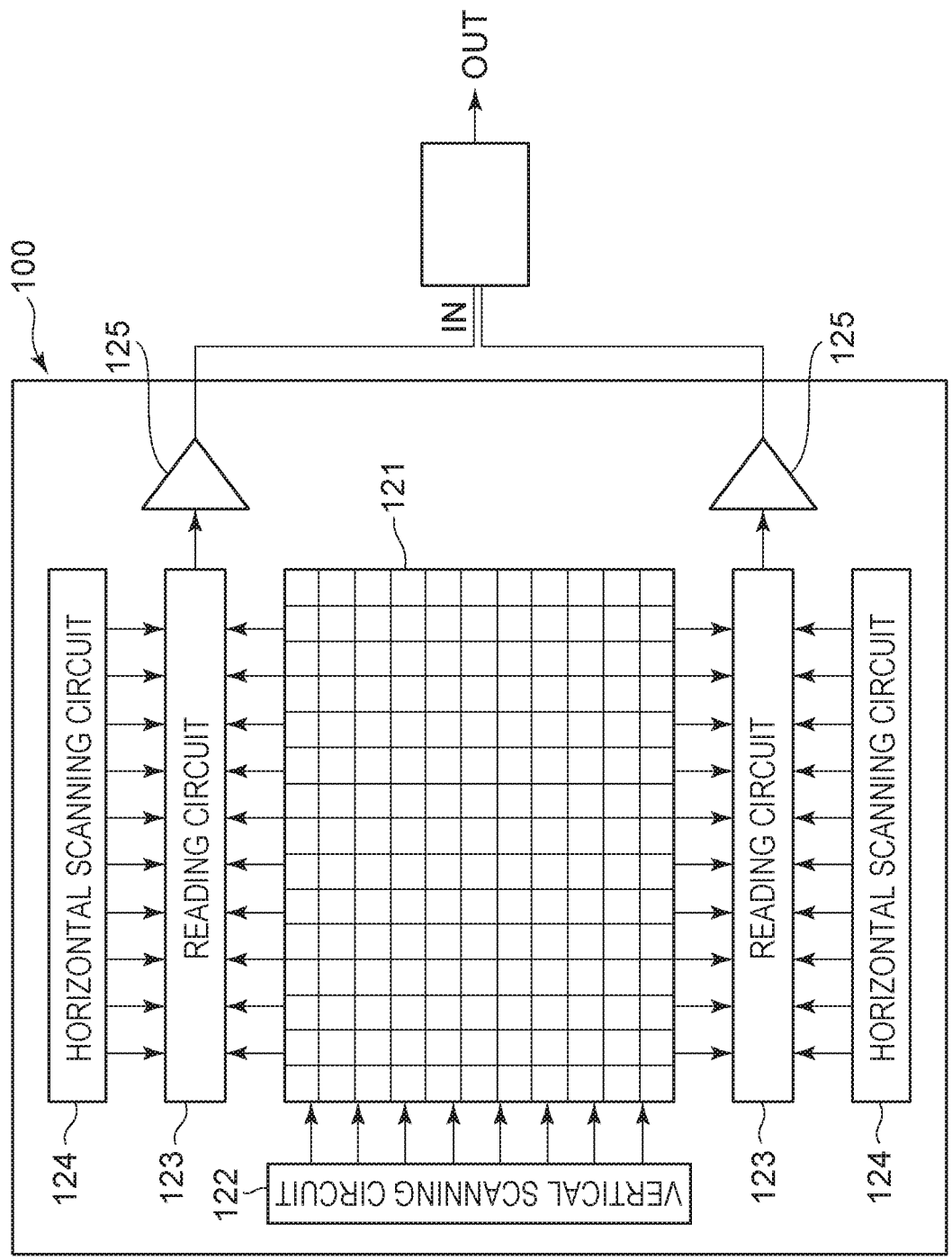
FIG. 1 is a block diagram illustrating an imaging apparatus according to a first embodiment.

FIG. 1 is a block diagram illustrating an imaging apparatus 100 according to the present disclosure. The imaging apparatus 100 includes a pixel region 121, a vertical scanning circuit 122, two reading circuits 123, two horizontal scanning circuits 124, and two output amplifiers 125. A region other than the pixel region 121 is a peripheral circuit region. The pixel region 121 includes a large number of pixels arranged in a matrix. The peripheral circuit region including the reading circuits 123, such as column amplifiers, correlated double sampling (CDS) circuits, and adder circuits, performs amplifying, adding, and the like on signals read through vertical signal lines from pixels in a row selected by the vertical scanning circuit 122. The horizontal scanning circuits 124 generate signals for successively reading signals based on pixel signals from the reading circuits 123. The output amplifiers 125 amplify signals of a column selected by the horizontal scanning circuits 124 and output the signals. Hereinafter, although a configuration using electrons as signal charges is described as an example, holes may be used as the signal charges.

Element Configuration of Each Pixel

Figure 2A:
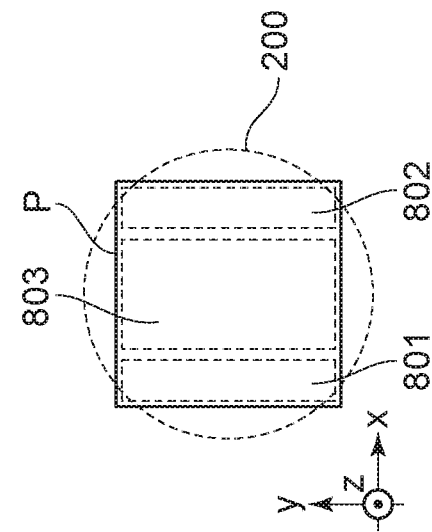
FIGS. 2A and 2C are cross-sectional views of a pixel and FIGS. 2B and 2D are plan views of the pixel according to the first embodiment.
Figure 2B:
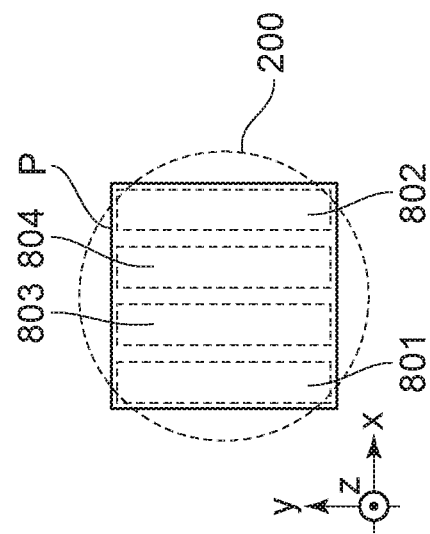

FIG. 2A is a cross-sectional view of a pixel 800 and FIG. 2B is a plan view of the pixel 800 in a height. In FIG. 2A, a member 810 schematically indicates a semiconductor substrate, a wiring layer, the reading circuits 123, and the like. An electrode 801 (a first electrode), an electrode 802 (a second electrode), and an electrode 803 (a third electrode) which serve as a lower electrode are disposed on the member 810.

A photoelectric conversion layer 820 and a counter electrode 830 serving as an upper electrode are disposed on the electrodes 801 to 803. The photoelectric conversion layer 820 is disposed so as to be sandwiched between the counter electrode 830 and the electrodes 801 to 803. A color filter 840 and a micro-lens 850 are disposed on the counter electrode 830.

The member 810 includes a wiring layer including a plurality of insulating layers and a plurality of lines. A layer constituting the insulating layers is formed of silicon oxide, BPSG, PSB, BSG, silicon nitride, or carbonized silicon. Furthermore, the lines are formed of conductive members, such as coper, aluminum, tungsten, tantalum, titanium, or a polysilicon.

Furthermore, the electrodes 801 to 803 are thin film electrodes which are formed of a transparent or opaque conductive member, such as ITO or aluminum. The electrodes 801 to 803 separate and collect charge generated in various regions in the photoelectric conversion layer 820.

The photoelectric conversion layer 820 includes organic compound which generates charge in accordance with an amount of incident light. A functional layer, such as a charge blocking layer, which suppresses injection of charge from the electrodes to the photoelectric conversion layer 820 may be disposed between the electrode 801 and the electrode 802 or between the photoelectric conversion layer 820 and the counter electrode 830.

The counter electrode 830 faces the electrodes 801 to 803 and is disposed so as to cover the photoelectric conversion layer 820. The counter electrode 830 applies a voltage to the photoelectric conversion layer 820 so as to generate an electric field in the photoelectric conversion layer 820. The counter electrode 830 is disposed on a light incident surface side relative to the photoelectric conversion layer 820, and therefore, the counter electrode 830 is formed of a conductive material, such as indium tin oxide (ITO), which is transparent relative to incident light.

A color filter 840 allows light of R, G, and B or light of C, M, and Y to pass. The color filter 840 may be a white filter or an infrared (IR) filter which allows light of a wavelength of RGB or CMY to pass. In particular, when ranging is performed, color is not required to be distinguished, and therefore, sensitivity is improved when a white filter is used for pixels for ranging. In a case where a plurality of types of color filter 840 are used and therefore a gap is generated between the color filters, a planarization layer may be disposed on the color filter 840.

A micro-lens 850 is formed of a material of resin or the like. For example, a region corresponding to one micro-lens may be determined as one pixel. FIG. 2B is a diagram illustrating an outer edge 200 of the micro-lens 850.

As illustrated in FIG. 2B, in a plan view, the electrode 801 is disposed in one end portion of a pixel P and the electrode 802 is disposed in the other end portion of the pixel P. The electrode 801 and the electrode 802 face each other in an x direction (a first direction), and the x direction is a direction of phase difference detection. The phase difference detection is performed based on signals read from the electrodes 801 and 802 so that distance information is obtained. Furthermore, the electrode 803 is disposed between the electrodes 801 and 802 and a signal read from the electrode 803 is used for imaging. The electrodes 801 and 802 are separately disposed with a gap corresponding to the electrode 803, and therefore, a long baseline length may be obtained. As a result, ranging accuracy may be improved.

As illustrated in FIG. 2B, a width of the electrode 803 in the x direction is larger than those of the electrodes 801 and 802. The larger the width of the electrode 803 becomes, the larger the distance between the electrodes 801 and 802 becomes, and therefore, when the baseline length is increased, the ranging accuracy is improved. For example, the width of the electrode 803 is set to be more than twice as large as those of the electrodes 801 and 802.

Furthermore, lengths of the electrodes 801 to 803 in a y direction are substantially the same. Here, the term "substantially the same" is a concept including a difference of lengths within a fabrication error. If the length of the electrode 803 is smaller than those of the electrodes 801 and 802, a portion of generated signal charge may not be collected and may be wasted. Not only the signal read from the electrode 803 but also the signals read from the electrodes 801 and 802 may be used for imaging. By this, an image of higher sensitivity may be formed.

Figure 2C:
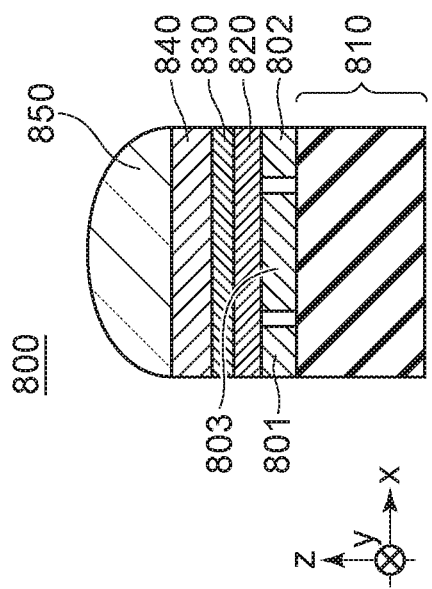
Figure 2D:
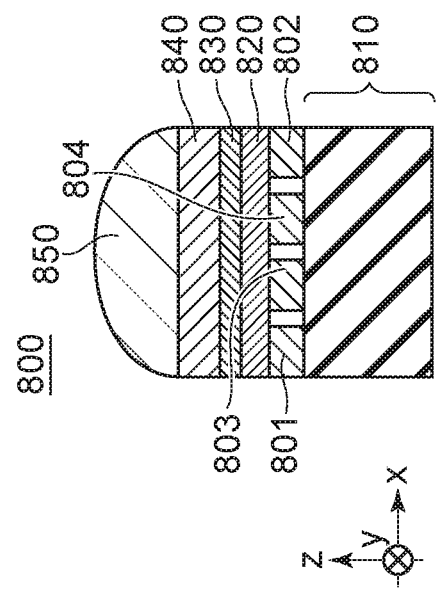

FIGS. 2C and 2D are diagrams illustrating a configuration further having an electrode 804 (a fourth electrode). Widths of the electrodes 804 and 803 are substantially the same as those of the electrodes 801 and 802 in the x direction. The substantially the same widths of the electrodes 801 to 804 efficiently suppress variation in fabrication. The signals output from the electrodes 801 and 802 are used for phase difference detection. Furthermore, the signals output from the electrodes 803 and 804 are used for imaging. Not only the signals output from the electrodes 803 and 804 but also the signals output from the electrodes 801 and 802 may be used for imaging. A value obtained by adding the widths of the electrodes 803 and 804 to each other is larger than the width of the electrode 801 and the width of the electrode 802. Accordingly, a large baseline length between the electrodes 801 and 802 may be obtained.

Note that, although the case where the width of the electrode 803 is larger than the widths of the electrodes 801 and 802 is illustrated in FIG. 2B, the width of the electrode 803 may be smaller than the widths of the electrodes 801 and 802. Also in this case, an imaging apparatus having improved sensitivity may be provided while a certain baseline length is ensured.

Example of Matrix of Pixels

Figure 3A:
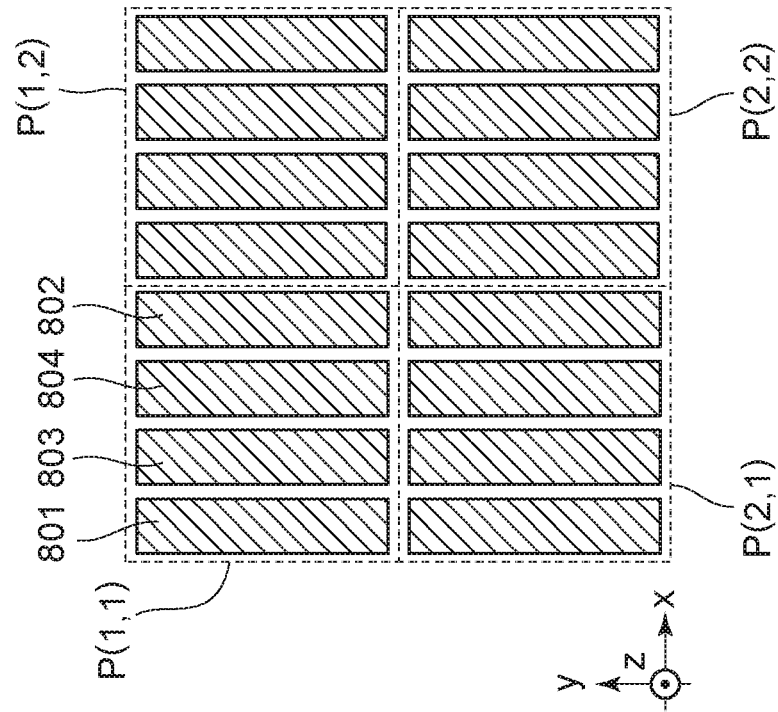
FIGS. 3A and 3B are diagrams illustrating examples of arrangement of a plurality of pixels according to the first embodiment.
Figure 3B:
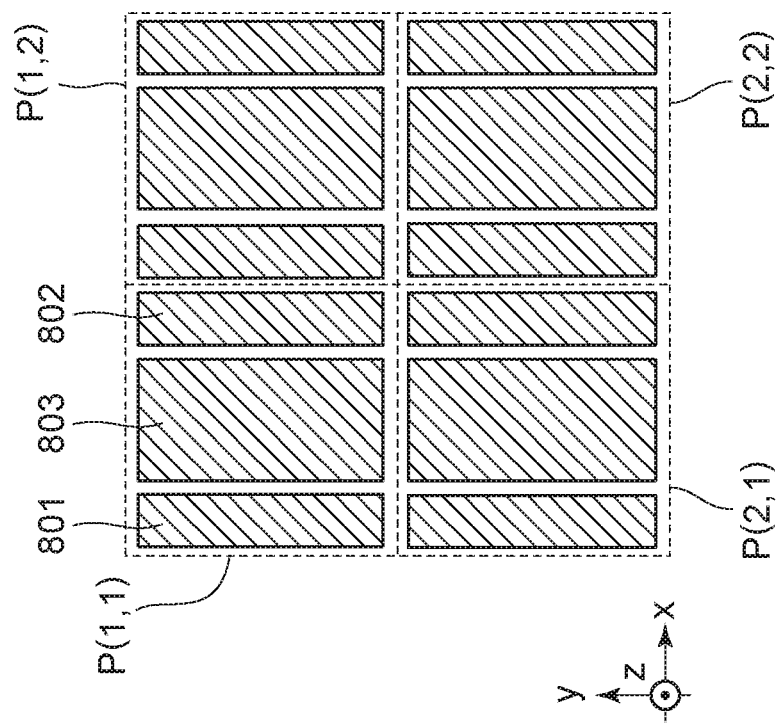

FIGS. 3A and 3B are diagrams illustrating examples of arrangement of a plurality of pixels. In FIG. 3A, pixels illustrated in FIGS. 2A and 2B are arranged in a matrix of 2 rows by 2 columns, for example. In FIG. 3B, pixels illustrated in FIGS. 2C and 2D are arranged in a matrix of 2 rows by 2 columns, for example. The pixels arranged in individual positions are denoted by "P(x, y)". "x" denotes a number of a row and "y" denotes a number of a column. In FIGS. 3A and 3B, positions of centers of gravity of the electrodes 801 to 803 of pixels arranged in the same row are the same in the x direction (the first direction). For example, in FIG. 3A, the center of gravity of the electrode 803 of a pixel P(1, 1) and the center of gravity of the electrode 803 of a pixel P(2, 1) are the same in the x direction.

Pixel Circuit

Figure 4:
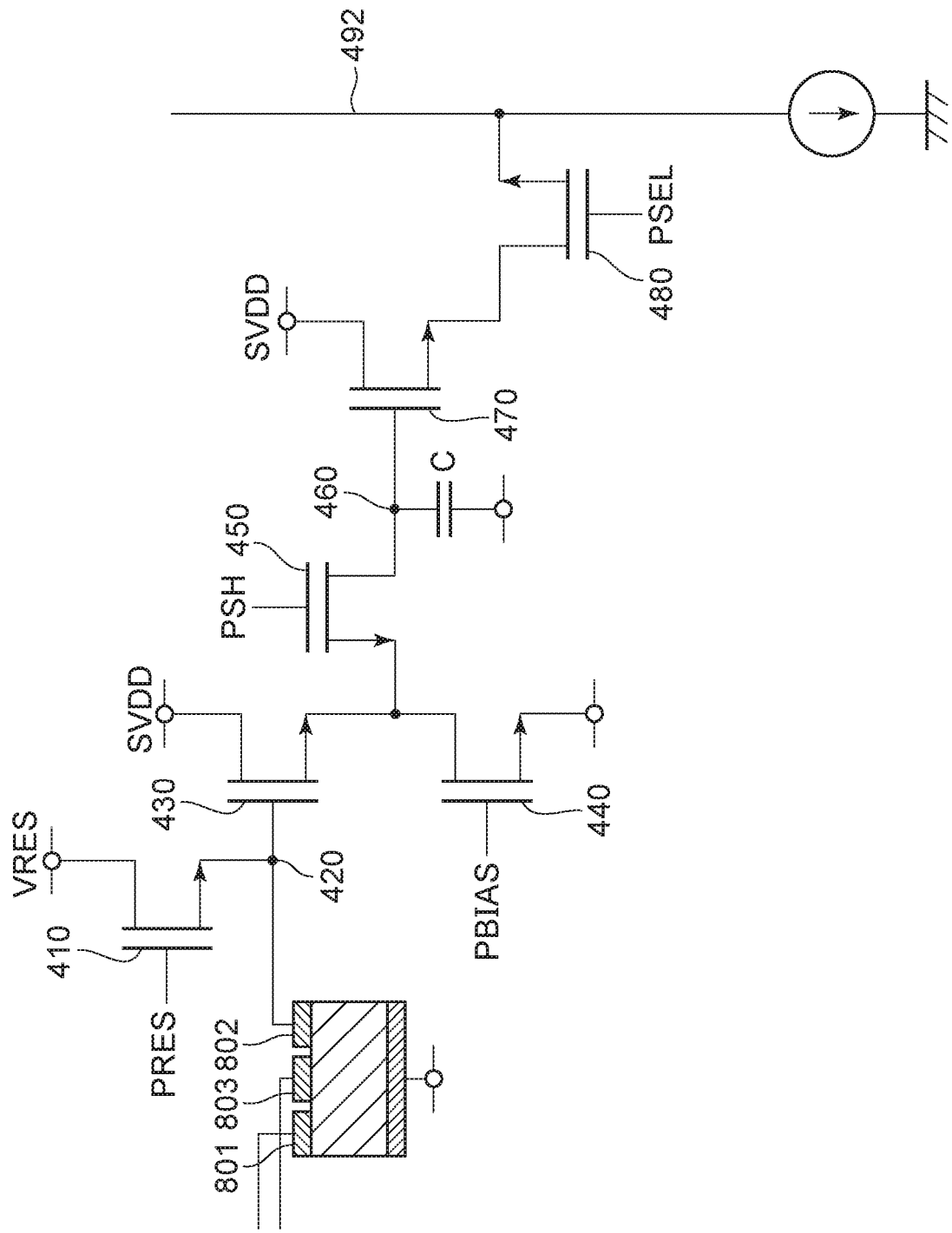
FIG. 4 is a diagram of an equivalent circuit of a pixel circuit disposed for each electrode according to the first embodiment.

FIG. 4 is a diagram illustrating an equivalent circuit of a pixel circuit corresponding to each electrode. For example, an equivalent circuit of a pixel circuit connected to the electrode 802 is illustrated in FIG. 4. The electrode 802 is connected to a gate of a first amplification transistor 430 through a first floating diffusion (FD) 420. A reset voltage VRES is written to the FD 420 through a reset transistor 410. A source of the first amplification transistor 430 is connected to a ground potential through a transistor 440. A drain of the first amplification transistor 430 is connected to a reference potential SVDD. The source of the first amplification transistor 430 is connected to a gate of a second amplification transistor 470 through a transistor 450 and a second FD 460. A drain of the second amplification transistor 470 is connected to the reference potential SVDD. A source of the second amplification transistor 470 is connected to an output line 492 through a selection transistor 480. A holding capacitor C is connected to the second FD 460.

Figure 5:
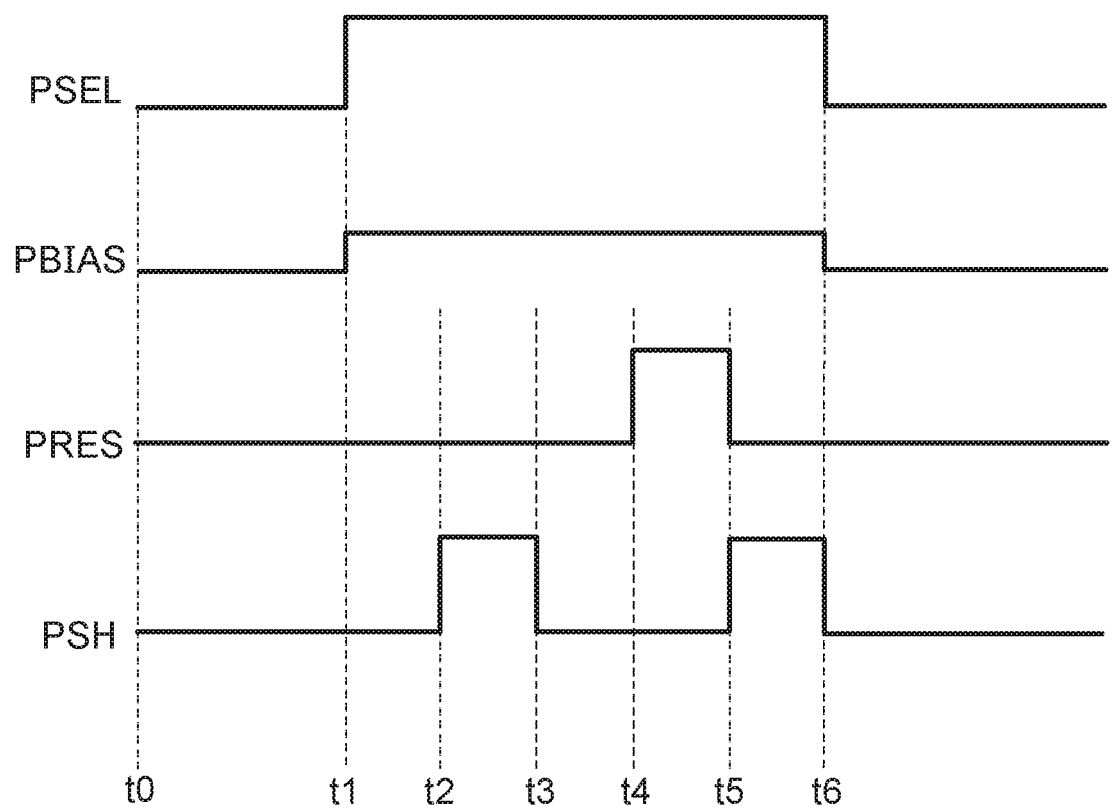
FIG. 5 is a diagram illustrating driving of the pixel circuit according to the first embodiment.

Driving of the pixel circuit illustrated in FIG. 4 will be described with reference to FIG. 5. A time point t0 is an arbitrary time point when accumulation of charge is started. At a time point t1, signals PSEL and PBIAS are brought into a high (H) level from a low (L) level so as to turn on the selection transistor 480 and the transistor 440. By this, a potential of a noise level (N signal) corresponding to the second FD 460 is output to the output line 492 through the second amplification transistor 470 and the selection transistor 480. The transistor 440 is operated as a current source, and therefore, the H level of the signal PBIAS is set so that a desired current value is obtained.

At a time point t2, a signal PSH is brought into an H level from an L level so that the transistor 450 is turned on, and at a time point t3, the signal PSH is brought into the L level from the H level so that the transistor 450 is turned off. By this driving, a potential of a signal level corresponding to charge accumulated in the FD 420 is transferred to the second FD 460 and a potential (an S signal) of a signal level which corresponds to the potential of the second FD 460 is output to the output line 492.

At a time point t4, a signal PRES is brought into an H level from an L level so that the reset transistor 410 is turned on. By this, the reset potential VRES is written to the first FD 420.

At a time point t5, the signal PRES is brought into the L level from the H level so that the reset transistor 410 is turned off, and a signal PSH is brought into an H level from an L level so that the transistor 450 is turned on. By this, a potential of a noise level corresponding to the first FD 420 is transferred to the second FD 460. The potential of the noise level is held by the holding capacitor C.

At a time point t6, the signals PSEL, PBIAS, and PSH are brought into the L level from the H level so that the selection transistor 480, the transistor 440, and the transistor 450 are turned off. By this, the charge accumulation is restarted. During the charge accumulation, the potential of the noise level is held by the holding capacitor C.

Note that, although the pixel circuit including the amplification transistors in the two stages is illustrated in FIG. 4, the pixel circuit may not include the amplification transistors in the two stages but may include a single amplification transistor.

Reading Circuit

Figure 6:
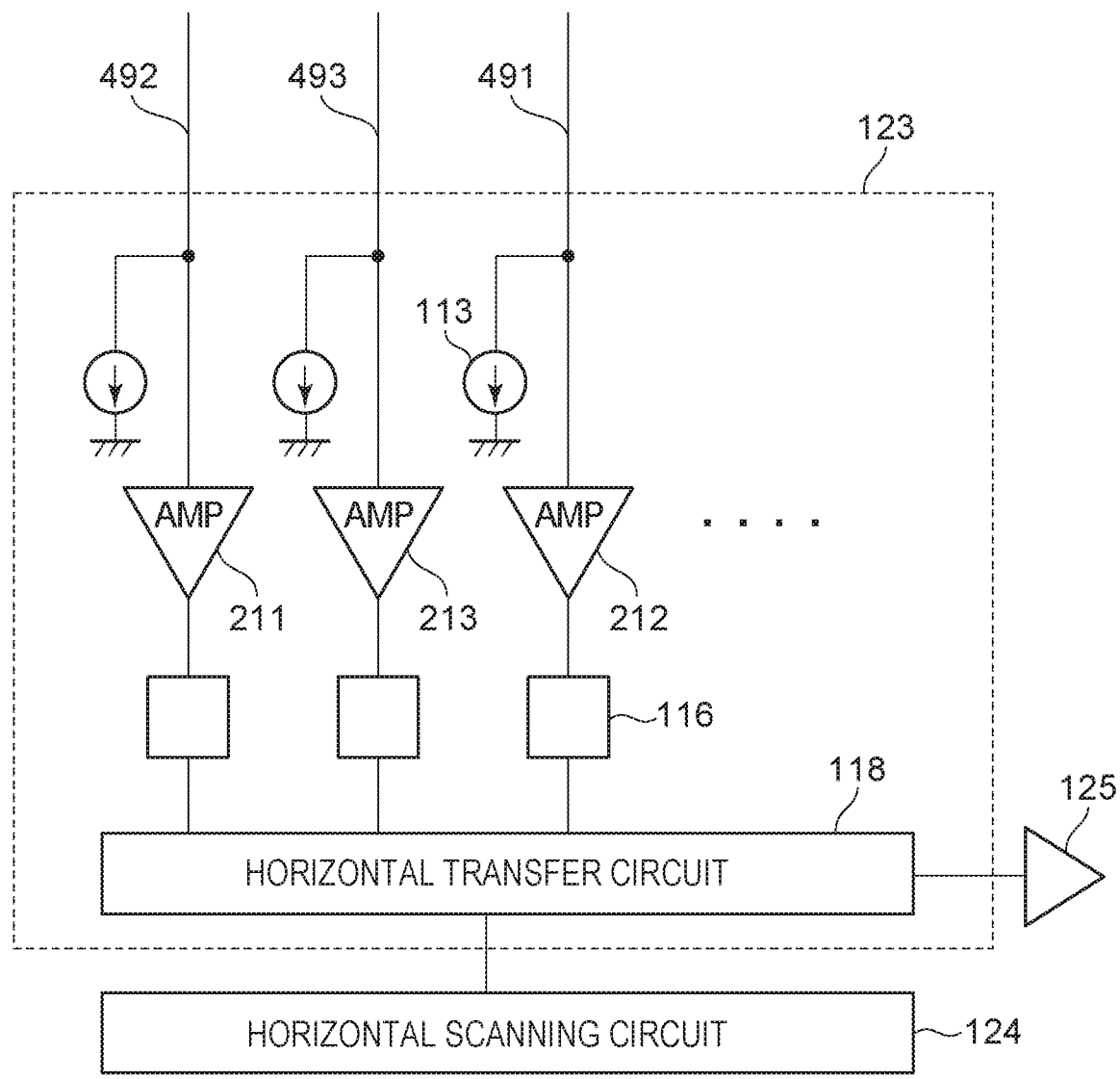
FIG. 6 is a diagram illustrating a configuration of a reading circuit illustrated in FIG. 1 according to the first embodiment.

FIG. 6 is a diagram illustrating a configuration of the reading circuits 123 illustrated in FIG. 1. Reference numerals the same as those of FIG. 1 denote the same components. In FIG. 6, the reading circuit 123 includes output lines 491 to 493 corresponding to the electrodes 801 to 803, constant current circuits 113, amplification circuits 211 to 213 corresponding to the output lines 491 to 493, signal accumulation units 116, and a horizontal transfer circuit 118. Furthermore, the horizontal scanning circuit 124 and the output amplifier 125 are illustrated in FIG. 6. The constant current circuits 113 serving as load units of amplification transistors and the amplification circuits 211 to 213 are connected to the output lines 491 to 493, and the signal accumulation units 116 are connected to output nodes of the amplification circuits 211 to 213.

The amplification circuits 211 to 213 amplify S signals and N signals supplied from the pixel circuits and outputs the signals to the signal accumulation units 116. The signal accumulation units 116 store the S signals and the N signals amplified by the amplification circuits 211 to 213. The horizontal scanning circuit 124 successively outputs the S signals and the N signals stored in the signal accumulation units 116 to the horizontal transfer circuit 118 for each column, and the signals are transmitted from the output amplifier 125 to a signal processing circuit (not illustrated). The signal processing circuit generates a difference signal which is a difference between the S signal and the N signal.

As illustrated in FIG. 2B, a width of the electrode 803 in the x direction is larger than those of the electrodes 801 and 802. When light is incident on a single micro-lens, an amount of charge which may be collected is changed depending on an area of an electrode. Specifically, an amount of charge which may be collected by the electrode 801 or the electrode 802 is smaller than that of the electrode 803. In this case, when amplification factors of the amplification circuits 211 to 213 are set in accordance with the amount of charge collected by the electrode 803, the amplification circuits 211 and 212 operate within a range in which a saturation amount is not reached. Therefore, when the amplification factors of the amplification circuits 211 and 212 are increased to be larger than that of the amplification circuit 213, a signal is amplified and an operation range of the circuit may be efficiently used. This is beneficial in that noise of signals obtained by the electrodes 801 and 802 may be further reduced.

Modification

FIG. 7A is a diagram illustrating an example of a modification of the arrangement example illustrated in FIG. 3A. In FIG. 7A, assuming that a width of the pixels P in the x direction corresponding to a pitch of a plurality of pixels in the x direction is denoted by L, a pixel P in a first row (P(1, 1), for example) and a pixel P in a second row (P(2, 1), for example) are shifted from each other in the x direction by L/2. Specifically, centers of gravity of electrodes in the first row and centers of gravity of electrodes in the second row are shifted from each other by L/2 in the x direction. Similarly, FIG. 7B is a diagram illustrating an example of arrangement of pixels shifted by L/2 in the x direction relative to the arrangement illustrated in FIG. 3B. The shift amount may not be L/2. For example, the arrangement may be shifted by L/4 in the x direction as illustrated in FIG. 7C or shifted by L/3 in the x direction as illustrated in FIG. 7D. In the case of FIG. 7C, centers of gravity of electrodes in pixels in a first row and centers of gravity of electrodes in pixels in a fourth row match each other in the x direction. Similarly, in the case of FIG. 7D, centers of gravity of electrodes in pixels in a first row and centers of gravity of electrodes in pixels in a third row match each other in the x direction.

FIG. 8A is a diagram illustrating an example of a modification of the arrangement in FIG. 7A. In FIG. 8A, electrode arrangement in a second pixel P(1, 2) is obtained by rotating electrode arrangement of a first pixel P(1, 1) by 90 degrees. Specifically, the electrodes 801 to 803 in the first pixel P(1, 1) extend in the second direction (the y direction), and the electrodes 801 to 803 in the second pixel P(1, 2) extend in the first direction (the x direction). With this configuration, phase difference information in the x direction and phase difference information in the y direction may be obtained from the pixel P(1, 1) and the pixel P(1, 2), respectively, that is, it is beneficial in that phase difference information in a plurality of directions may be obtained. Similarly, FIG. 8B is a diagram illustrating an example of a modification of the arrangement illustrated in FIG. 7B, and phase difference information in different directions may be obtained also by the configuration illustrated in FIG. 8B.

Although the arrangement of the electrodes which are rotated by 90 degrees relative to an adjacent pixel is described in FIGS. 8A and 8B, electrodes rotated by an angle other than 90 degrees may be arranged. Alternatively, the pixels may not be arranged adjacent to each other, and the electrode arrangement of the pixel P(1, 1) is employed in the substantially entire pixel region and the electrode arrangement of the pixel P(1, 2) may be discretely employed in the other region. Furthermore, the electrode arrangement of the pixel P(1, 1) may be employed in a plurality of pixels arranged in an N-th row and the electrode arrangement of the pixel P(1, 2) may be employed in a plurality of pixels arranged in an (N+1)-th row.

According to the embodiment described above, a long baseline length may be obtained by a long distance between electrodes from which signals for phase difference detection are obtained, and therefore, ranging accuracy may be improved. Furthermore, since an electrode from which an imaging signal is obtained is disposed between the electrodes from which phase difference detection signals are obtained, sensitivity may be improved while a signal charge is not wasted.

Second Embodiment

A second embodiment will be described with reference to FIGS. 9A, 9B, 10, and 11.

Figure 9A:
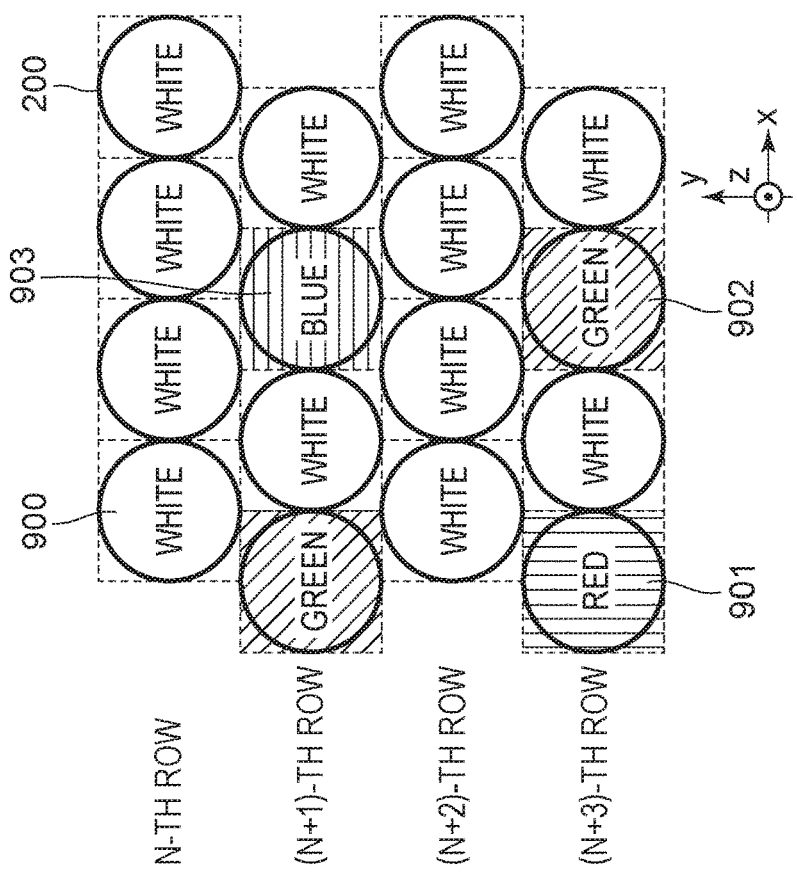
FIGS. 9A and 9B are diagrams illustrating a pixel array and a color filter array according to a second embodiment.
Figure 9B:
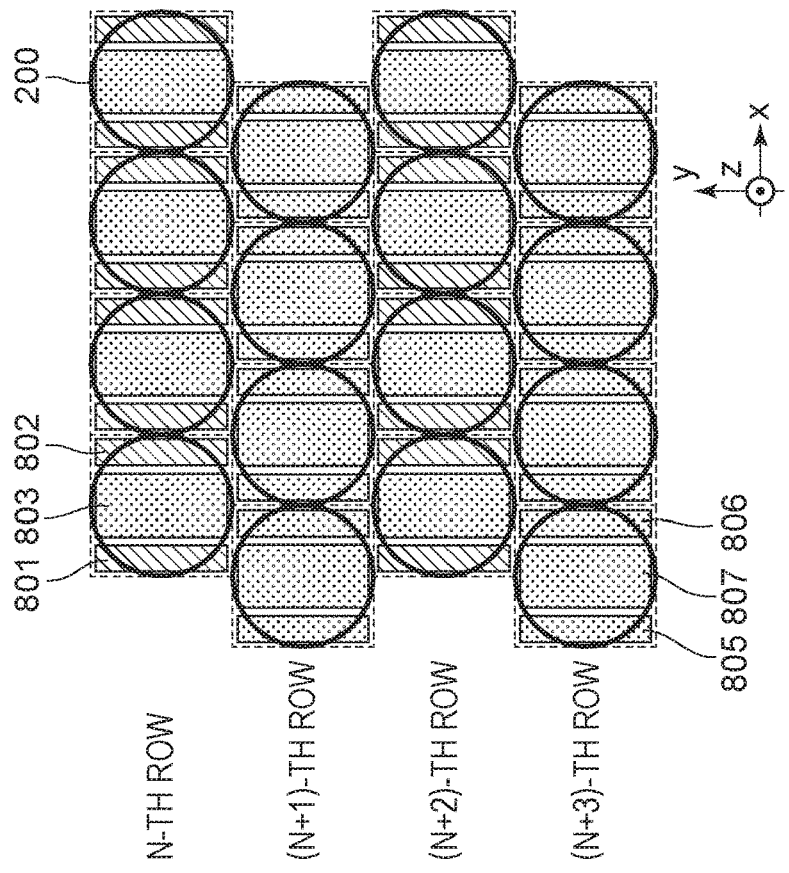

FIGS. 9A and 9B are diagrams illustrating pixel arrangement and color filter arrangement according to this embodiment. Although an N-th pixel row to an (N+3)-th pixel row (a first pixel row to a fourth pixel row) are illustrated in FIGS. 9A and 9B for convenience sake, a larger number of pixels may be arranged in a pixel region in practice.

In FIG. 9A, a plurality of pixels arranged in the N-th row and the (N+2)-th row correspond to the pixels described in the first embodiment. Specifically, in each of the pixels, phase difference detection signals are read from electrodes 801 and 802 and an imaging signal is read from an electrode 803. Specifically, the plurality of pixels arranged in the N-th row and the (N+2)-th row are included in a pixel group (a first pixel group) for performing ranging and imaging. On the other hand, pixels in which imaging signals are read from electrodes 805 to 807 are arranged in the (N+1)-th row and the (N+3)-th row. Specifically, the plurality of pixels arranged in the (N+1)-th row and the (N+3)-th row are included in a pixel group (a second pixel group) for performing only imaging. The pixels in the individual rows are shifted by a half pitch.

FIG. 9B is a diagram illustrating color filter arrangement. Only pixels having a white filter (W pixels) which allows white light to pass are arranged in the N-th row and the (N+2)-th row. Furthermore, W pixels and pixels having an R, G, or B filter (color pixels) are arranged in the (N+1)-th row and the (N+3)-th row. Specifically, a pixel having a green filter (a G pixel) and a pixel having a blue filter (a B pixel) are arranged in the (N+1)-th row. Furthermore, a pixel having a red filter (an R pixel) and W pixels are arranged in the (N+3)-th row. The individual color pixels are arranged adjacent to the W pixels in a row direction and a diagonal direction. A transparent wavelength band of the color filter of the W pixels may include an infrared wavelength range.

A light transmittance of the white filter (a first color filter) is higher than those of the R, G, and B filters (second color filters). Therefore, when a row subjected to ranging includes only W pixels, sensitivity on the pixels from which phase difference detection signals are to be obtained is improved, and accordingly, ranging may be performed with high accuracy. Note that the light transmittance is typically obtained from light intensity of white light incident on a filter and light intensity of light which passes the filter.

As illustrated in FIG. 9A, an electrode pattern of the pixel group which performs ranging and imaging and an electrode pattern of the pixel group which performs only imaging are substantially the same. Therefore, an imaging apparatus which has high reliability and which is capable of suppressing variation in fabrication may be provided. Furthermore, although the pixel arrangement of FIG. 9A is illustrated based on the pixel configuration illustrated in FIG. 2B, the pixel arrangement may be based on the pixel configuration illustrated in FIG. 2D.

Figure 10:
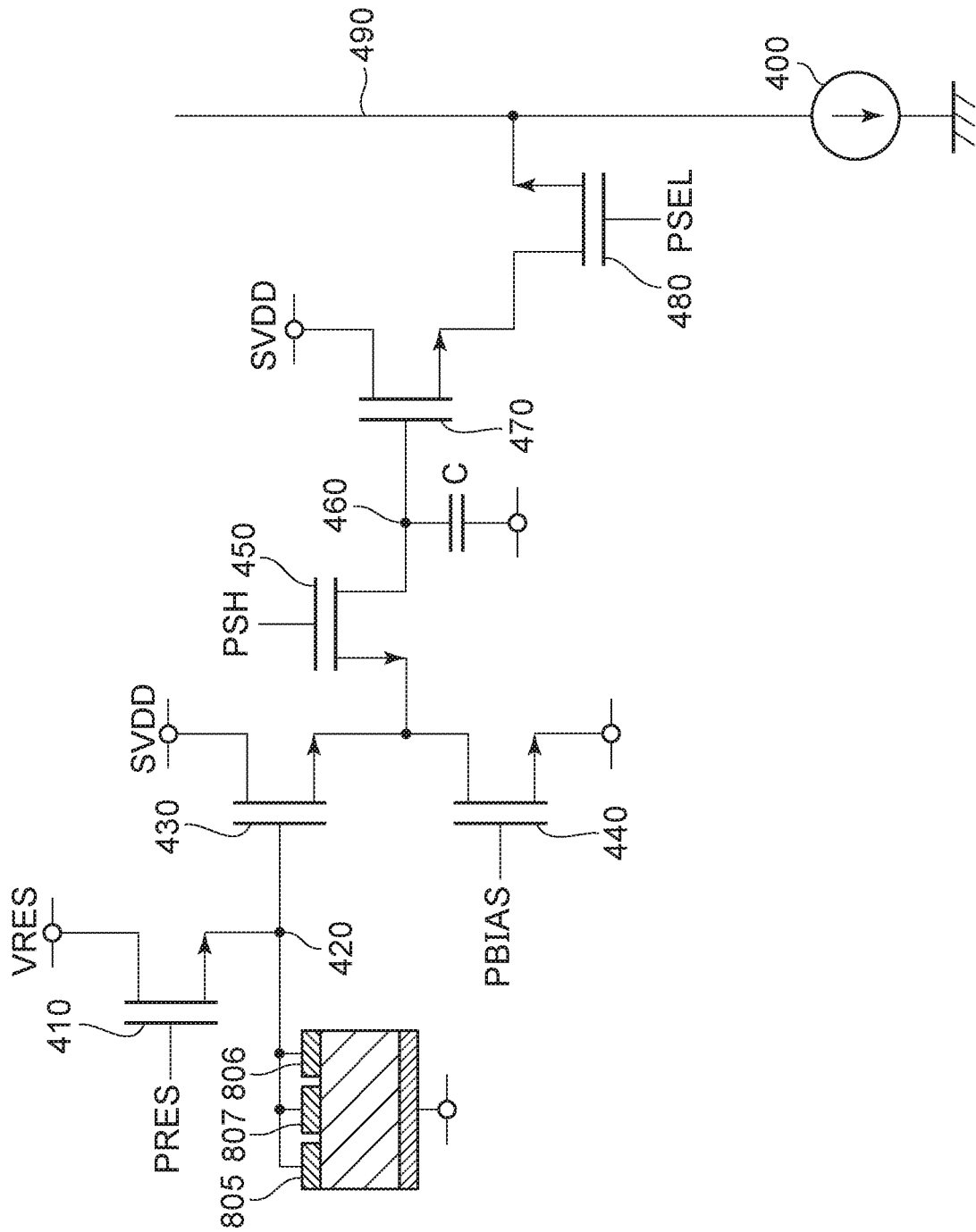
FIG. 10 is a diagram illustrating an equivalent circuit of a pixel circuit associated with a pixel which performs only imaging according to the second embodiment.

FIG. 10 is a diagram illustrating an equivalent circuit of a pixel circuit associated with the pixel which performs only imaging. As illustrated in FIG. 4, in the circuit of the pixel which performs ranging, an output node of one electrode is input to a gate of one amplification transistor, that is, one electrode corresponds to one amplification transistor. On the other hand, as illustrated in FIG. 10, in the pixel only performing imaging, output nodes of three electrodes are connected to a gate of one amplification transistor, that is, a plurality of electrodes correspond to one amplification transistor. Accordingly, a circuit size may be reduced. However, the pixel circuit in which one electrode corresponds to one amplification transistor as illustrated in FIG. 4 may be employed in the pixel which performs only imaging.

Figure 11:
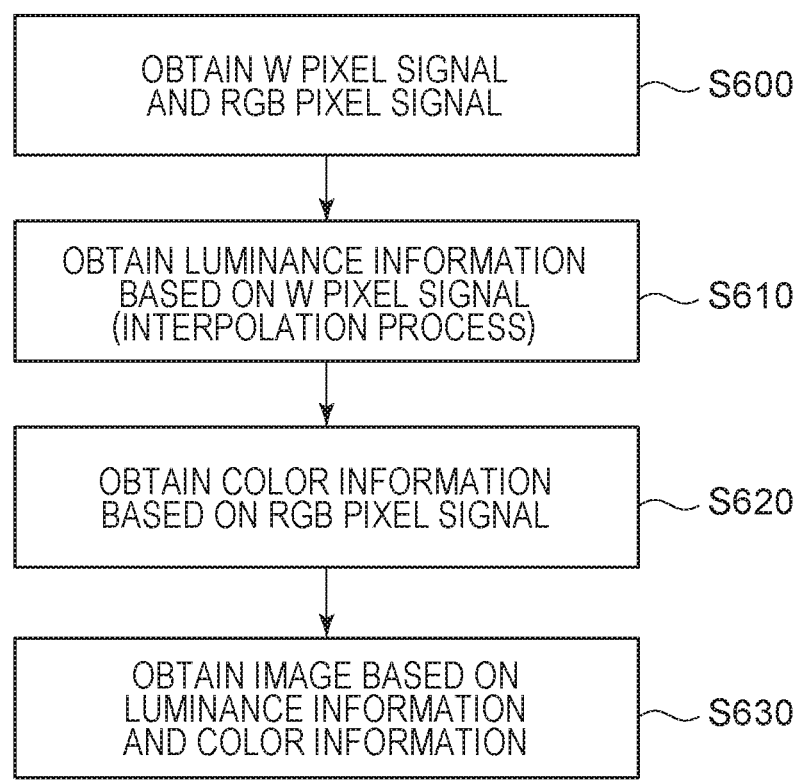
FIG. 11 is a flowchart of an image formation process using a plurality of pixels illustrated in FIGS. 9A and 9B according to the second embodiment.

FIG. 11 is a flowchart of image formation using a plurality of pixels illustrated in FIGS. 9A and 9B. First, signals are obtained from the W pixels and the R, G, and B pixels (S600).

Luminance information is obtained using the signals obtained from the W pixels (S610). Here, luminance information in positions of the R pixel, the G pixels, and the B pixel are obtained by performing an interpolation process on signals of a plurality of W pixels surrounding these pixels. In other words, luminance information of the pixels (the R, G, and B pixels) having the second color filter is obtained from the signals obtained from the pixels (W pixels) having the first color filter.

Thereafter, color information is obtained using the signals obtained from the R, G, and B pixels (S620). Since a color filter which allows light of a specific wavelength band to pass is arranged in the individual pixels, a red signal component in a position of the B pixel is obtained from the R pixel and the interpolation process is performed, for example. Furthermore, a red signal component, a green signal component, and a blue signal component in a position of the W pixel are obtained from the R, G, and B pixels and the interpolation process is performed. In other words, color information of the pixels (the W pixels) having the first color filter is obtained from the signals obtained from the pixels (the R, G, and B pixels) having the second color filter.

Finally, the luminance information and the color information obtained as described above are combined with each other so that a desired image is obtained. Note that, in the process described above, a signal obtained by the imaging apparatus is processed by a signal processing apparatus installed outside the imaging apparatus.

With the configuration described above, luminance information may be obtained in a large number of pixels since the R, G, and B pixels are surrounded by the W pixels, and therefore, an image of high sensitivity may be formed.

Note that, although the pixel group which performs only imaging is arranged in the (N+1)-th row and the (N+3)-th row in the example above, signals read from the electrodes 805 and 806 may be used for phase difference detection. Specifically, a plurality of pixels arranged in a row in which R, G, and B pixels are arranged may be determined as a pixel group (a second pixel group) which performs imaging and phase difference detection. By this, signals for phase difference detection may be obtained in all the rows, and therefore, resolution of the phase difference detection may be improved. The R, G, and B pixels and the W pixels have different light transmittances of color filters. Therefore, when the R, G, and B pixels arranged in the (N+1)-th row and the (N+3)-th row are used as signals for phase difference detection, another signal process is to be performed. On the other hand, when signals read from the electrodes 805 and 806 in the W pixels arranged in the (N+1)-th row and the (N+3)-th row are used as signals for phase difference detection, such a signal process is not required. Specifically, a configuration in which signals read from the W pixels in the N-th row to the (N+3)-th row are used as signals for phase difference detection and signals read from the R, G, and B pixels in the (N+1)-th row and the (N+3)-th row are not used as signals for phase difference detection is also a possible embodiment.

Furthermore, although the imaging signals are read from all the electrode 807 (a fifth electrode), the electrode 805 (a sixth electrode), and the electrode 806 (a seventh electrode) in the foregoing description, the imaging signals may be read only from the electrode 807 (the fifth electrode).

According to the embodiment described above, a long baseline length may be obtained by a long distance between electrodes from which signals for phase difference detection are obtained, and therefore, ranging accuracy may be improved. Furthermore, since an electrode from which an imaging signal is obtained is disposed between the electrodes from which phase difference detection signals are obtained, sensitivity may be improved while a signal charge is not wasted.

Third Embodiment

FIGS. 12A and 12B are diagrams illustrating pixel arrangement and color filter arrangement according to a third embodiment. This embodiment is different from the second embodiment in that, although the pixels are shifted every row in the second embodiment, pixels are shifted every two rows in the third embodiment.

In FIGS. 12A and 12B, although pixels in an N-th row and an (N+1)-th row are not shifted from each other, pixels in the (N+1)-th row and pixels in an (N+2)-th row are shifted from each other by a half pitch. Specifically, a pixel row in which ranging and imaging are performed (a pixel row only including W pixels) and a pixel row in which only imaging is performed (a pixel row including an R, G, or B pixel and W pixels) constitute one pair and a plurality of such pairs are shifted from each other. Furthermore, individual color pixels are arranged adjacent to the W pixels in a row direction, a column direction, and a diagonal direction.

When the W pixels in the N-th row and the W pixels in the (N+2)-th row are focused, these pixels are shifted from each other by a half pitch, and therefore, a sampling period in the row direction is twice as large as that in a case where the pixels are not shifted from each other. Specifically, the resolution of the phase difference detection may be improved twice while a large pixel size is maintained.

The method for obtaining an image using luminance information and color information according to the second embodiment may be employed in this embodiment.

According to the embodiment described above, a long baseline length may be obtained by a long distance between electrodes from which signals for phase difference detection are obtained, and therefore, ranging accuracy may be improved. Furthermore, since an electrode from which an imaging signal is obtained is disposed between the electrodes from which phase difference detection signals are obtained, sensitivity may be improved while a signal charge is not wasted.

Fourth Embodiment

Figure 13B:
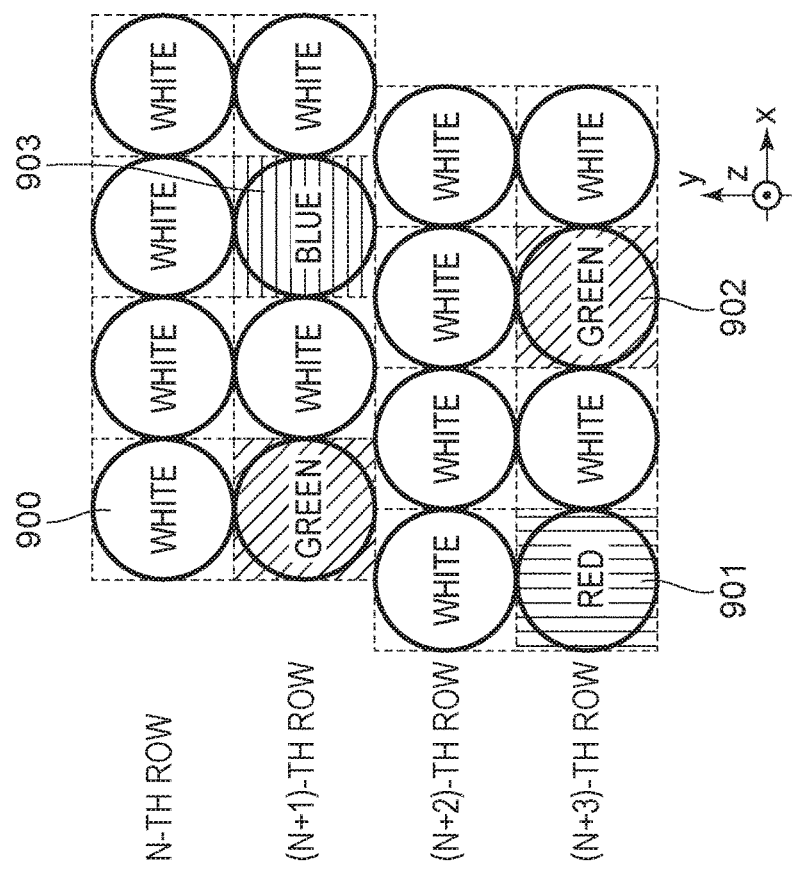
FIGS. 13A and 13B are diagrams illustrating a pixel array and a color filter array according to a fourth embodiment.

A fourth embodiment is described with reference to FIGS. 13A, 13B, and 14. This embodiment is different from the third embodiment in that, although a plurality of electrodes are disposed in each pixel in the pixel row including the R, G, or B pixel arranged therein in the third embodiment, only one electrode is disposed in this embodiment.

Figure 13A:
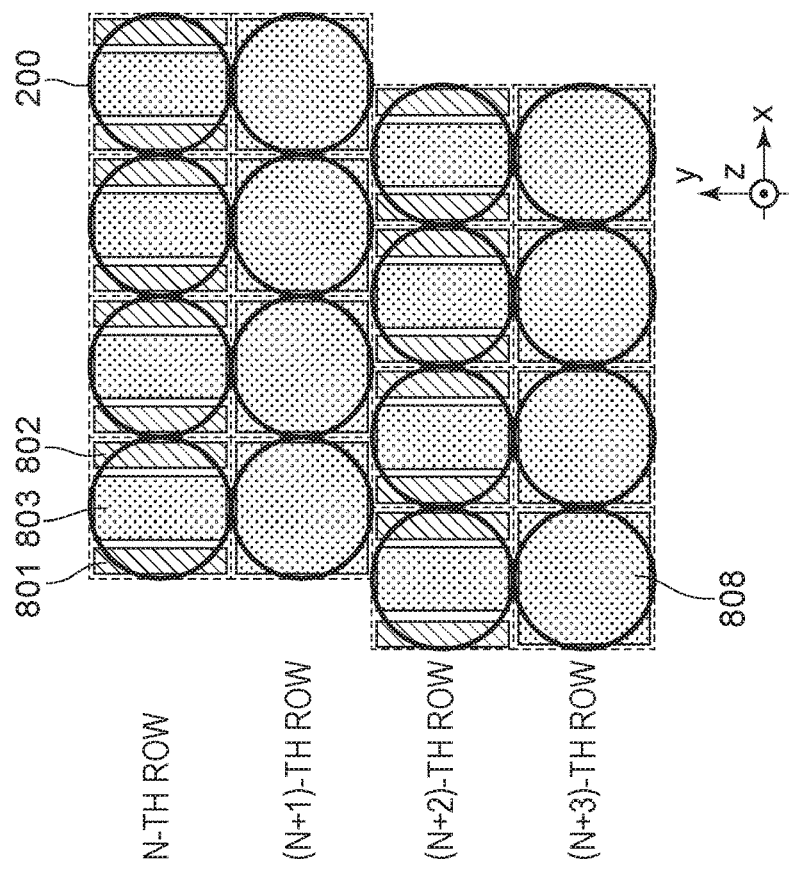

In FIG. 13A, a pixel group (a first pixel group) which is arranged in an N-th row and an (N+2)-th row and which performs ranging and imaging has an electrode configuration the same as that of the pixels illustrated in FIG. 12A. On the other hand, this embodiment is different from the third embodiment in that a pixel group (a second pixel group) which is disposed in an (N+1)-th row and an (N+3)-th row and which performs only imaging has only an electrode 808 (a fifth electrode) in FIG. 13A although a plurality of electrodes are disposed in FIG. 12A. Furthermore, a length of the electrode 808 in a first direction (an x direction) is larger than a length of an electrode 803. Since each of the electrodes 805 to 807 are separately arranged in FIG. 12A, electric field concentration may occur at end portions of the individual electrodes and dark current may be generated. On the other hand, according to the configuration of this embodiment illustrated in FIG. 13A, the number of end portions of the electrodes may be reduced, and accordingly, noise reduction may be attained.

FIG. 14 is a diagram illustrating a pixel circuit of a pixel group only performing imaging according to this embodiment. As illustrated in FIG. 14, only one electrode is included in a pixel, and therefore, a circuit size may be reduced when compared with a case where pixel circuits are disposed for individual electrodes as illustrated in FIG. 4.

Other Embodiments

Embodiment of On-Vehicle Imaging System

Figure 15A:
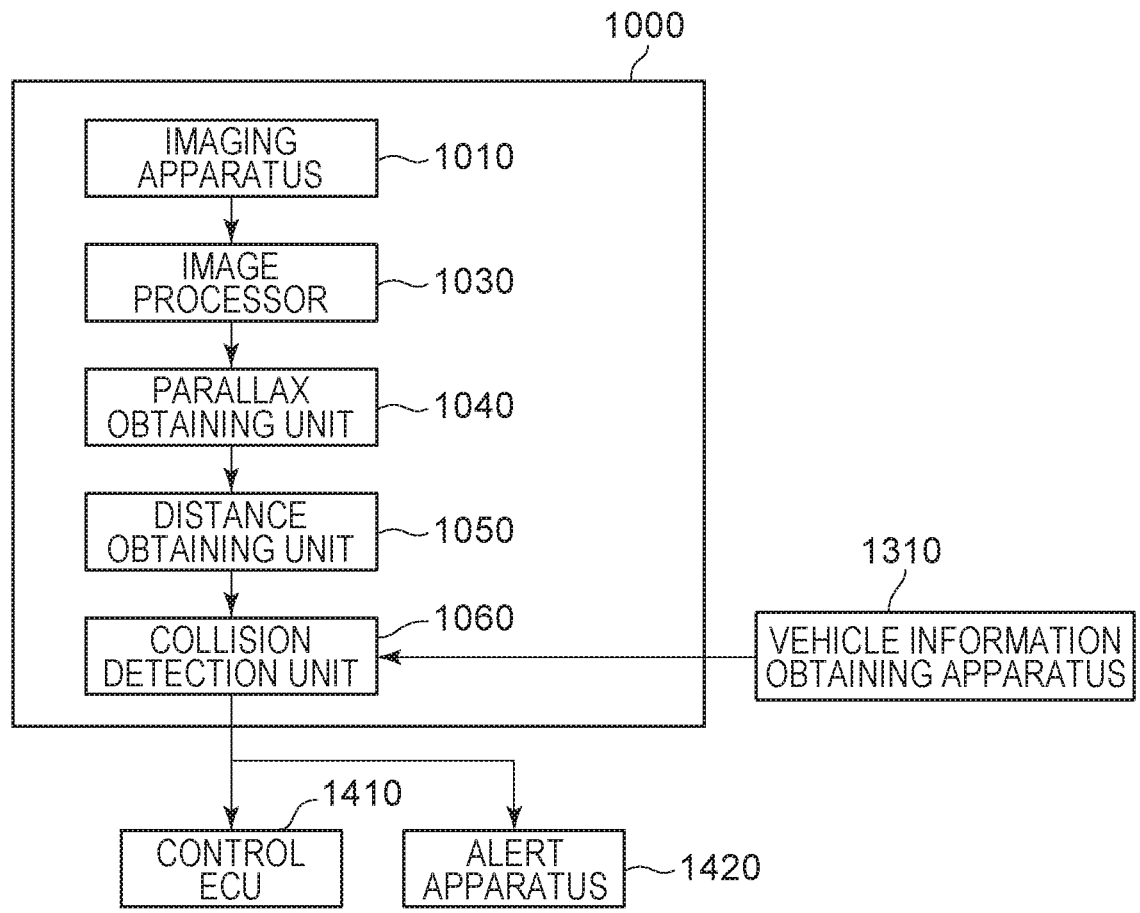
FIGS. 15A and 15B are diagrams illustrating an imaging system of an on-vehicle camera.

FIG. 15A is a diagram illustrating an example of an imaging system associated with an on-vehicle camera. An imaging system 1000 includes one of the imaging apparatuses according to the foregoing embodiments as an imaging apparatus 1010. The imaging system 1000 further includes an image processor 1030 which performs image processing on a plurality of image data obtained by the imaging apparatus 1010 and a parallax obtaining unit 1040 which obtains parallax (a phase difference between parallax images) from the plurality of image data obtained by the imaging system 1000. The parallax obtainment is performed using signals read from divided electrodes in the imaging apparatus described above.

The imaging system 1000 includes a distance obtaining unit 1050 which obtains information on a distance to a target object based on obtained parallax information and a collision determination unit 1060 which determines whether collision may occur based on the obtained distance. Here, the parallax obtaining unit 1040 and the distance obtaining unit 1050 are examples of a distance information obtaining unit which obtains information on a distance to a target object. Specifically, the distance information is associated with parallax, a defocusing amount, a distance to a target object, and the like. The collision determination unit 1060 may determine collision possibility using one of the items of the distance information. The distance information obtaining unit may be realized by dedicated hardware, a software module, or a combination of the dedicated hardware and the software module. Furthermore, the distance information obtaining unit may be realized by a field programmable gate array (FPGA) or an application specific integrated circuit (ASIC). Furthermore, the distance information obtaining unit may be realized by a combination of the FPGA and the ASIC.

The imaging system 1000 is connected to a vehicle information obtaining apparatus 1310 which obtains vehicle information including a vehicle speed, a yaw rate, and a rudder angle. The imaging system 1000 is connected to a control ECU 1410 which is a control device which outputs a control signal which generates a braking force to a vehicle based on a result of the determination performed by the collision determination unit 1060. Furthermore, the imaging system 1000 is also connected to an alert apparatus 1420 which generates an alert to a driver based on the result of the determination performed by the collision determination unit 1060. When the collision possibility is high as a result of the determination performed by the collision determination unit 1060, for example, the control ECU 1410 performs vehicle control to avoid collision and reduce damage by applying a brake, releasing an accelerator, or suppressing an engine output. The alert apparatus 1420 issues an alert for a user by ringing alarm by sound or the like, displaying alert information on a screen of a car navigation system or the like, or applying vibration on a seat belt or a steering.

In this embodiment, a surrounding region of a vehicle, such as a front region or a back region, is imaged by the imaging system 1000.

Figure 15B:
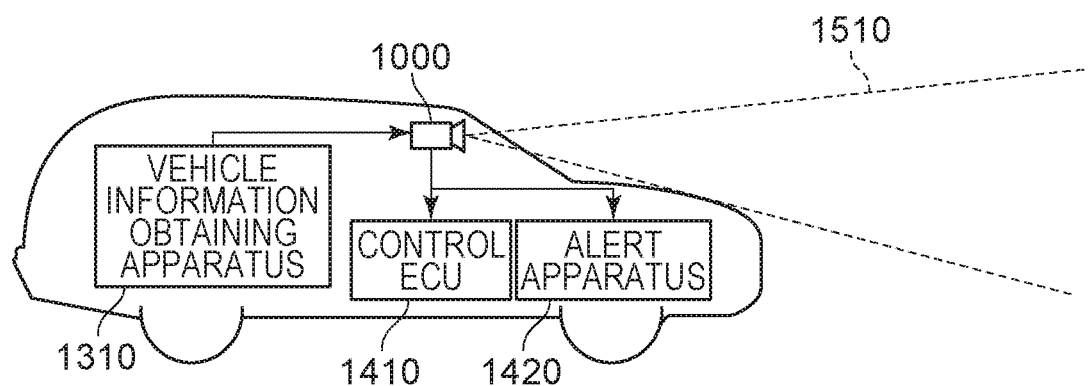

FIG. 15B is a diagram illustrating an imaging system which captures an image of a front region of a vehicle. Although the control for avoiding collision against other vehicles is illustrated in the foregoing description, the present disclosure is applicable to control of automatic driving by following another vehicle and control of automatic driving for avoiding out-of-line. Furthermore, the imaging system is applicable to not only vehicles, such as own car, but also moving bodies (moving devices), such as ships, airplanes, and industrial robots, for example. Furthermore, the imaging system is widely applicable to, in addition to the moving bodies, devices using object recognition, such as an intelligent transport system (ITS).

Note that the foregoing embodiments are merely concrete examples for embodying the present disclosure, and the technical scope of the present disclosure is not limited to the embodiments. Specifically, the present disclosure may be embodied by various forms without departing from the scope of the present disclosure or main characteristics. Furthermore, various combinations of the embodiments described above may be employed.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-108238 filed May 31, 2017, which is hereby incorporated by reference herein in its entirety.

What is claimed is:

1. A photoelectric conversion apparatus including a plurality of pixels arranged on a substrate in a matrix,
wherein at least one of the pixels included in a first pixel group includes:
a first electrode;
a second electrode facing to the first electrode;
a third electrode disposed between the first and second electrodes;
a photoelectric conversion layer disposed on the first, second, and third electrodes; and
a micro-lens corresponding to the first, second, and third electrodes;
wherein at least one of the pixels included in a second pixel group includes:
a fourth electrode;
a fifth electrode facing to the fourth electrode;
the photoelectric conversion layer disposed on the fourth and fifth electrodes; and
a micro-lens corresponding to the fourth and fifth electrodes;
wherein the first, second, and third electrodes are electrically connected to nodes that are different from one another, respectively, and
wherein the fourth and fifth electrodes are electrically connected to a same node.

2. The photoelectric conversion apparatus according to claim 1,
wherein signals for phase difference detection are read from the first and second electrodes, and
wherein a signal for imaging is read from the third electrode.

3. The photoelectric conversion apparatus according to claim 1,
wherein signals for phase difference detection are read from the first and second electrodes, and
wherein a signal for imaging is read from the third, fourth, and fifth electrodes.

4. The photoelectric conversion apparatus according to claim 1,
wherein the first electrode is electrically connected to a gate of a first amplification transistor,
wherein the second electrode is electrically connected to a gate of a second amplification transistor,
wherein the third electrode is electrically connected to a gate of a third amplification transistor, and
wherein the fourth and fifth electrodes are electrically connected to a gate of a fourth amplification transistor.

5. The photoelectric conversion apparatus according to claim 1, further comprising:
a sixth electrode disposed between the fourth and fifth electrodes;
wherein the fourth, fifth, and sixth electrodes are electrically connected to a same node.

6. The photoelectric conversion apparatus according to claim 1,
wherein the first and second electrodes face to each other in a first direction, and wherein lengths of the first, second, and third electrodes are substantially the same in a second direction, which is different from the first direction.

7. The photoelectric conversion apparatus according to claim 1,
wherein a length of the third electrode is greater than lengths of the first and second electrodes in the first direction.

8. The photoelectric conversion apparatus according to claim 1, further comprising:
a first output line to which a signal from the first electrode is output;
a second output line to which a signal from the second electrode is output; and
a third output line to which a signal from the third electrode is output;
wherein an amplification rate of a column amplifier arranged so as to correspond to the first output line or the second output line is larger than an amplification rate of a column amplifier arranged so as to correspond to the third output line.

9. The photoelectric conversion apparatus according to claim 1,
wherein each of the pixels included in the first pixel group has a first color filter,
wherein at least one of the pixels included in the second pixel group has a second color filter, and
wherein a transmittance of the first color filter is higher than a transmittance of the second color filter.

10. The photoelectric conversion apparatus according to claim 1,
wherein the pixels included in the first pixel group are shifted from the pixels included in the second pixel group by a half pitch.

11. The photoelectric conversion apparatus according to claim 1,
wherein the first pixel group has first and third pixel rows,
wherein the second pixel group has second and fourth pixel rows,
wherein the first, second, third, and fourth pixel rows are arranged in this order, and
wherein pixels included in the first pixel row and pixels included in the second pixel row are shifted from pixels included in the third pixel row and pixels included in the fourth pixel row by a half pitch.

12. A signal processing apparatus which processes a signal output from the photoelectric conversion apparatus according to claim 9, the signal processing apparatus performing:
processing for obtaining luminance information of a pixel having the second color filter from a signal obtained from a pixel having the first color filter; and
processing for obtaining color information of the pixel having the first color filter from a signal obtained from the pixel having the second color filter.

13. A signal processing apparatus which processes a signal output from the photoelectric conversion apparatus according to claim 1,
wherein distance information is obtained from the signal for phase difference detection read from the photoelectric conversion apparatus.

14. A moving body, comprising:
the photoelectric conversion apparatus according to claim 1;
a distance information obtaining unit configured to obtain information on a distance to a target object in accordance with parallax information based on a signal supplied from the photoelectric conversion apparatus; and a control unit configured to control the moving body based on the distance information.

* * * * *